United States Patent [19]  
Sunada et al.

[11] 4,329,251  
[45] May 11, 1982

[54] TITANIUM TRICHLORIDE CATALYTIC COMPONENT AND METHOD FOR HOMO- OR CO-POLYMERIZATION OF α-OLEFIN

[75] Inventors: Yoichi Sunada, Shin-nanyo; Yoshikazu Takahashi, Hikari; Masaru Takitani, Shin-nanyo, all of Japan

[73] Assignee: Toyo Stauffer Chemical Co., Ltd., Tokyo, Japan

[21] Appl. No.: 161,334

[22] Filed: Jun. 20, 1980

[30] Foreign Application Priority Data

Jun. 29, 1979 [JP] Japan ................................. 54-83220

[51] Int. Cl.$^3$ ............................................. C08F 4/64
[52] U.S. Cl. .................................. 252/429 B; 526/142
[58] Field of Search .................................... 252/429 B

[56] References Cited

U.S. PATENT DOCUMENTS 3,582,987 6/1971 Natta et al. ................. 252/429 B X
4,251,388 2/1981 Takahashi et al. .............. 252/429 B

FOREIGN PATENT DOCUMENTS 51-76196  7/1976 Japan .
51-90998  8/1976 Japan .
51-94496  8/1976 Japan .
52-47594  4/1977 Japan .
52-115797 9/1977 Japan .
53-12796  2/1978 Japan .
53-124186 10/1978 Japan .
53-138487 12/1978 Japan .

*Primary Examiner*—Patrick Garvin
*Attorney, Agent, or Firm*—Armstrong, Nikaido, Marmelstein & Kubovcik

[57] ABSTRACT

A titanium trichloride catalytic component and a method for homo- or co-polymerization of an α-olefin. In separating a titanium trichloride catalytic component from a solution prepared by dissolving titanium tetrachloride, an organic ether compound and an organoaluminum compound in a solvent, the above stated solvent is a mixed solvent prepared by allowing 20~70% by volume of an aromatic hydrocarbon halide to be concomitant with a saturated aliphatic hydrocarbon and/or an alicyclic hydrocarbon in the presence of an olefin; the organo-aluminum compound, the titanium tetrachloride and the organic ether compound are added to the mixed solvent at a solvent temperature not exceeding 55° C.; then, the solvent temperature is raised to a temperature between 45 and 150° C. over a period between 10 minutes and 24 hours; and, during this temperature raising process, an organic ether compound and/or titanium tetrachloride is further added to have a titanium trichloride catalytic component measuring 10 to 500μ in average particle diameter separated from the solvent. The titanium trichloride catalytic compound thus obtained is used in the homo- or co-polymerization of α-olefins. The invention aims at improvement in adjustment of the particle size, uniformity of the particle diameter and the strength of the titanium trichloride catalytic component and eventually at improvement in the particle shape and uniformity thereof of the polymer to be obtained by the use of the catalytic component.

7 Claims, No Drawings

TITANIUM TRICHLORIDE CATALYTIC COMPONENT AND METHOD FOR HOMO- OR CO-POLYMERIZATION OF α-OLEFIN

BACKGROUND OF THE INVENTION

1. Field of the Invention

This invention relates to a very strong and highly active titanium trichloride catalytic component for polymerization of an α-olefin which permits adjustment of the average particle diameter thereof to a value between 10 and 500μ as desired and has a high degree of uniformity of the particle diameter and a method for homo- or co-polymerization of an α-olefin which is carried out in the presence of a catalytic combination of the above stated titanium trichloride catalytic component and an organo-aluminum compound to obtain a polymer product having a highly uniform spherical particle shape. More particularly stated, the invention relates to such catalytic component and a method which either dispense with or simplify deashing and washing processes generally necessitated in the manufacture of an α-olefin polymer; facilitate the gas-phase polymerization of an α-olefin or propylene in particular which has been considered difficult; and obviate the necessity of a pelletizing process in the manufacture of the polymer.

2. Description of the Prior Art

There have been proposed many and various methods for obtaining a titanium trichloride catalytic component that has a high polymerization activity and is capable of enhancing productivity for a stereospecific polymer. However, almost all of the catalytic component obtainable by the manufacturing methods of these prior arts are in a powdery state having uneven particle sizes. Accordingly, the polymer obtained from the use of such a catalytic component has been in a powdery state and has caused troubles in manufacturing processes because it is difficult to separate, dry and transport. Further, the polymer obtained from the use of such a catalytic component has necessitated pelletization through melting, kneading, extruding and shaping processes after drying and before the polymer product thus obtained is supplied to molding and machining fields. An α-olefin polymer manufacturing plant thus has required a great amount of cost of facilities for the pelletizing processes consuming a great amount of energy and lowering the productivity of the plant. Thus, these conventional titanium trichloride catalytic components have many shortcomings. If it is possible to obtain a catalytic component which permits polymerization to obtain a polymer that has a highly uniform particle diameter without including any fine granular polymer therein, such a catalytic component not only would enhance the operation efficiency of a polymer manufacturing plant but also would completely obviates the necessity of such an additional process of pelletizing the polymer produced. Then, such a catalytic component would immensely contribute to the rationalization of the polymer manufacturing processes of the plant. Therefore, development of such an ideal catalytic component has been strongly desired.

There have recently been developed some granular catalytic components which have a high polymerization activity and permit to obtain stereospecific polymers at a high rate of productivity. For example, a Japanese patent application laid-open No. 47-34478 discloses a method for obtaining a δ-type titanium trichloride of a dark purple color and a granular shape. In that method a β-type titanium trichloride is obtained by reducing a titanium tetrachloride at a low temperature with an organo-aluminum compound; the β-type titanium trichloride is treated with a complexing agent; and then the trichloride is subjected to a heating treatment in a titanium tetrachloride. Further, Japanese patent applications laid-open No. 51-16298, laid-open No. 51-76196 and laid-open No. 53-12796 also disclose a method of obtaining fine granular solid titanium trichlorides through a liquid matter, which is obtained by treating a titanium tetrachloride with an organo-aluminum compound in the presence of an organic ether compound, into contact with a liberating agent such as Lewis acid or the like at a temperature below 150° C.

The catalytic component obtainable by such methods is an excellent catalytic component having a high polymerization activity. However, the average particle diameter of the titanium trichloride catalytic component thus obtained is 30 to 40μ at the most. Particularly, the particle size of the titanium trichloride catalytic component obtainable by the latter method is still to small and the catalytic component is difficult to handle because of its poor fluidity and its small bulk density. When an α-olefin is polymerized by using such a catalytic component, a polymer thus obtained also has small particle diameter and small bulk density. Besides, the use of such a catalytic component not only results in a low productivity for obtaining a stereospecific polymer but also necessitates a pelletizing process because it is in a powdery state.

A method of reducing a titanium tetrachloride with an organo-aluminum compound in the presence of an olefin also has been proposed by another Japanese patent application laid-open No. 52-142691. The subject matter of this prior art lies in that: In reducing the titanium tetrachloride with the organo-aluminum compound, a titanium trichloride is allowed to separate while a slight amount of propylene is supplied during the reducing process; and then a further treatment is carried out with a complexing agent and the titanium tetrachloride. However, a catalyst obtained from a combination of a titanium tetrachloride and an organo-aluminum compound is known by the name of a Ziegler catalyst and has been in use as catalyst for polymerization of an olefin. Judging the above stated prior art from this knowledge, it seems that a low molecular weight olefin polymer produced by the use of the titanium tetrachloride and the organo-aluminum compound comes to serve as binder to cause a separated titanium trichloride to coagulate into a coagulated titanium trichloride. Therefore, it is believed that, in accordance with this method of the prior art, the particle diameter of the titanium trichloride cannot be made smaller though it can be made larger. This has been also found in an experiment which will be described hereinafter as reference example.

Meanwhile, the present inventors have previously proposed a titanium trichloride catalytic component which has a high polymerization activity and a high productivity for obtaining a stereospecific polymer and which permits to control as desired its particle diameter and eventually to control as desired the particle diameter of the olefin polymer to be obtained therefrom and, thereby, which obviates the necessity of a pelletizing process and a method of carrying out a homo- or co-polymerization of an α-olefin in the presence of a catalyst consisting of the titanium trichloride catalytic component and an organo-aluminum compound as disclosed in Japanese patent applications laid open No. 54-90094 and laid open No. 55-3456. The inventors have further studied for a method of manufacturing a titanium trichloride which has a great strength. As a result of the study, they have discovered that, in the process of allowing a titanium trichloride to separate, an arrangement to carry out the process in the presence of an α-olefin gives a titanium trichloride catalytic component which is of a small particle diameter between $\frac{2}{3}$ and $\frac{1}{2}$ of the catalytic component obtainable without having any olefin present during the separating process and which greatly excells in strength. This discovery has led to the present invention. Judging from the fact that there exists several percent of an olefin polymer in the titanium trichloride catalytic component, this phenomenon probably results from that the polymer serves to solidify the particles of the catalyst in such a way as to make the particles smaller and, at the same time, to make them stronger. This is a wonderful fact hardly expectable from the prior arts.

SUMMARY OF THE INVENTION

It is therefore a general object of the invention to provide a titanium trichloride catalytic component which is obtained in the following manner: A mixed solvent in which a titanium tetrachloride, an organic ether compound and an organo-aluminum compound are dissolved is heated to raise its temperature or is temporarily cooled midway the temperature raising process as desired and the temperature is again raised; then, at an arbitrary point of time either during the temperature raising process or during the temporary cooling period, the organic ether compound and/or the titanium tetrachloride is further added; and heating is effected up to a high temperature in the presence of an olefin to separate the titanium trichloride catalytic component.

In accordance with the invention, the mixed solvent which is arranged to have a titanium tetrachloride, an organic ether compound and an organo-aluminum compound dissolved therein must have an aromatic hydrocarbon halide present in a saturated aliphatic hydrocarbon and/or an alicyclic hydrocarbon. It is another essential condition for the invention that the separation of the titanium trichloride catalytic component must be allowed to take place in the presence of an olefin. Without this arrangement, it is impossible to impart a great strength to the particles of the titanium trichloride catalytic component and, at the same time, to adjust the particle diameter thereof as desired.

The above and further objects, features and advantages of the invention will become apparent from the following detailed description thereof:

DETAILED DESCRIPTION OF THE INVENTION

The olefin to be used in accordance with the present invention is either one kind of or a mixture of more than two kinds of olefins having their carbon number not exceeding 6. Such an olefin that has its carbon number not exceeding 6 may be selected out of the group consisting of ethylene, propylene, butylene, pentene, hexene and preferably out of the group consisting of ethylene, propylene, butene-1 and isobutylene and is most preferably selected out of ethylene and propylene. Where ethylene or propylene is employed, it is possible to mix a small amount of hydrogen therewith. As for the manner in which the olefin is to be supplied, it is preferable to have the olefin dissolved beforehand in the mixed solvent in which a titanium tetrachloride, an organic ether compound and an organo-aluminum compound are dissolved. However, it is also possible to continuously supply the olefin during the reaction process. The quantity of the olefin to be used can be determined as desired. The particle diameter of the titanium trichloride catalytic component which comes to separate becomes smaller according as the quantity of the olefin increases. It is also possible to carry out the separating process under the pressure of the olefin. However, a separation process under pressure exceeding 0.5 atm does not bring about any particular increase in the effect thereof.

The halogen of the aromatic hydrocarbon halide to be used in accordance with the invention may be selected out of the group consisting of chlorine, bromine, iodine and fluorine. The aromatic hydrocarbon halide may be selected, for example, out of the chlorinated group consisting of chloro-benzene, chloro-toluene, chloro-xylene, chloro-ethyl benzene, dichloro-benzene, dichloro-toluene, dichloro-xylene, trichloro-benzene, trichloro-toluene, chloro-bromo-benzene, etc.; out of the brominated aromatic hydrocarbons including bromo-benzene, bromo-toluene, bromo-xylene, bromo-ethyl benzene, dibromo-benzene, dibromo-toluene, dibromo-xylene, tribromo-benzene, tribromo-toluene, etc.; and preferably out of the chlorinated and brominated aromatic hydrocarbons including chloro-benzene, chloro-toluene, chloro-xylene, dichloro-benzene, dichloro-toluene, dichloro-xylene, bromo-benzene, bromo-toluene, bromo-xylene, dibromo-benzene, dibromo-toluene, dibromo-xylene, etc.

The saturated aliphatic hydrocarbon to be used in accordance with the invention may be selected out of the group consisting of n-pentane, n-hexane, n-heptane, n-octane and n-decane. The alicyclic hydrocarbon usable in accordance with the invention may be selected out of the group consisting of cyclopentane, cyclohexane, cycloheptane, cyclooctane, methyl-cyclohexane, etc.

In one method usable for adjustment of the particle diameter of the titanium trichloride catalytic component, the particle diameter is controlled as desired by adjusting the concentration of the aromatic hydrocarbon halide contained in the mixed solvent. The concentration of the aromatic hydrocarbon halide in the mixed solvent is set within the range from 20 to 70% by volume, preferably from 25 to 65% by volume and more preferably from 30 to 60% by volume. Within this concentration range, the particle diameter of the titanium trichloride catalytic component to be produced becomes smaller according as the concentration of the aromatic hydrocarbon halide increases. Conversely, the particle diameter becomes larger according as the concentration of the aromatic hydrocarbon halide decreases. The particle diameter of the produced titanium trichloride catalytic component is uneven when the concentration is less than 20% by volume. Besides, in this instance, the polymerization activity of the catalytic component and the stereospecificity of the polymer product obtainable by the use thereof are degraded to a great degree. On the other hand, when the concentration exceeds 70% by volume, the particle diameter of the catalytic component becomes so small that the titanium trichloride catalytic component cannot easily filtrated and washed and this lowers the productivity of the catalytic component.

The titanium tetrachloride is used in quantity not exceeding 5 mol for one liter of the mixed solvent and preferably not exceeding 2 mol. On the other hand, there is set no particular value for the lower limit. However, it is preferable to use at least 0.01 mol of the titanium tetrachloride in consideration of the productivity for the titanium trichloride catalytic component.

The organic ether compound usable in accordance with the invention is a compound that is expressed by a generic formula of ROR', wherein R and R' represent either the same or different alkyl radicals and at least one of R and R' has a carbon number not exceeding 5. The organic ether compound may be selected out of the group consisting of, for example, di-n-amyl ether, di-n-butyl ether, di-n-propyl ether, n-amyl-n-butyl ether, n-amylisobutyl ether, n-butyl-n-propyl ether, n-butylisoamyl ether, n-propyl-n-hexyl ether, n-butyl-n-octyl ether, etc. Of these compounds, the use of di-n-butyl ether is most effective.

The quantity of the organic ether compound to be dissolved in the mixed solvent is 0.8 to 3 mol for 1 mol of the titanium tetrachloride and preferably in the range from 1 to 2.5 mol. When less than 0.8 mol of the organic ether compound is used for 1 mol of the titanium tetrachloride, the polymerization activity of the titanium trichloride catalytic component and the productivity for a stereospecific polymer decrease. Conversely, the use of more than 3 mol of it lowers not only the yield of the catalytic component but also the productivity for a stereospecific polymer.

The organo-aluminum compound usable in accordance with the invention is an organo-aluminum compound expressed by a generic formula of $AlRnX_{3-n}$, →$AlRnX_{3-n}$ wherein R represents an alkyl group having a carbon number 1 to 10; X represents a halogen atom or a hydrogen atom; and n represents a real number of $0<n\leq 3$. The organo-aluminum compound in which n=3, for example, may be selected out of the group consisting of trimethyl aluminum, triethyl aluminum, tri-n-propyl aluminum, tri-n-butyl aluminum, triisobutyl aluminum, tri-n-pentyl aluminum, tri-n-hexyl aluminum, tri-n-octyl aluminum, etc. The organo-aluminum compound in which X is a hydrogen atom may be selected out of the group consisting of dimethyl aluminum hydride, diethyl aluminum hydride, di-n-butyl aluminum hydride, diisobutyl aluminum hydride, di-n-pentyl aluminum hydride, di-n-hexyl aluminum hydride, di-n-octyl aluminum hydride, methyl aluminum dihydride, ethyl aluminum dihydride, n-butyl aluminum dihydride, isobutyl aluminum dihydride, dipropyl aluminum hydride, propyl aluminum dihydride, etc. Further, the compound in which X is a halogen atom may be selected, for example, out of the group consisting of dimethyl aluminum chloride, diethyl aluminum chloride, di-n-propyl aluminum chloride, di-n-butyl aluminum chloride, diisobutyl aluminum chloride, di-n-pentyl aluminum chloride, di-n-hexyl aluminum chloride, di-n-octyl aluminum chloride, methyl aluminum sesqui-chloride, ethyl aluminum sesqui-chloride, n-propyl aluminum sesqui-chloride, n-butyl aluminum sesqui-chloride, isobutyl aluminum sesqui-chloride, ethyl aluminum dichloride, n-propyl aluminum dichloride, isobutyl aluminum dichloride, n-hexyl aluminum dichloride, diisohexyl aluminum chloride, isohexy aluminum dichloride, etc. Before the use of the organo-aluminum compound, the compound is preferably diluted to a suitable degree with an aromatic hydrocarbon such as benzene, toluene, xylene or the like or with the aromatic hydrocarbon halide, the saturated aliphatic hydrocarbon or the alicyclic hydrocarbon which is used in the preparation of the mixed solvent in accordance with the invention, or with a mixture of them. It is most preferable to dilute the organo-aluminum compound with the aromatic hydrocarbon halide. In accordance with the invention, the organo-aluminum compound is used as reducing agent for the purpose of reducing a tetravalent titanium to a trivalent titanium. Generally, the addition of such an organo-aluminum compound in quantity equivalent of the tetravalent titanium is sufficient for such a purpose. However, in the presence of the aromatic hydrocarbon halide, the addition quantity of the organo-aluminum compound is interrelated with the particle diameter of the separating titanium trichloride catalytic component. In view of this interrelation, it is preferable to set the addition quantity of the organo-aluminum compound within the range from 0.3 to 1.8 equivalent relative to the titanium tetrachloride. When the addition quantity of the organo-aluminum compound is less than 0.3 equivalent relative to the titanium tetrachloride, the yield of the titanium trichloride greatly decreases. Conversely, the addition of it in excess of 1.8 equivalent lowers the polymerization activity and the productivity for the stereospecific polymer. In another method for adjusting the particle diameter of the titanium trichloride catalytic component, the particle diameter is controlled by adjusting the quantities of the organic ether compound, the titanium tetrachloride and the organo-aluminum compound. In this instance, it is also essential to have the aromatic hydrocarbon halide present. Without the presence of the aromatic hydrocarbon halide there, it is hardly possible to adjust the particle diameter of the titanium trichloride as desired.

For example, in case where the concentrations of the organic ether compound and the titanium tetrachloride are fixed, the particle diameter of the produced titanium trichloride catalytic component becomes smaller according as the addition quantity of the organo-aluminum compound increases. However, the particle diameter conversely becomes larger when the addition quantity of the organo-aluminum compound exceeds a certain limit. This fact is hardly expectable from the conventional methods. However, the addition quantity of the organo-aluminum compound at which the minimal particle diameter is obtainable varies with the mole ratio of the organic ether compound to the titanium tetrachloride. When the mole ratio of the organic ether compound to the titanium tetrachloride is lowered, a small addition quantity of the organo-aluminum compound causes the titanium trichloride catalytic component to have the minimal particle diameter. Further, when the concentrations of the titanium tetrachloride and the organo-aluminum compound are fixed, the particle diameter of the catalytic component becomes smaller according as the concentration of the organic ether compound increases.

The organic ether compound to be added during the temperature raising process or during the temporary cooling period in the temperature raising process in accordance with the invention may be selected out of the same group of the above stated organic ether compounds from which the above stated organic ether compound is also selected. The addition quantity of the organic ether compound for this purpose is less than 4 mol for one mol of the titanium tetrachloride contained in the mixed solvent, preferably less than 3.5 mol and most preferably less than 2.4 mol. Addition quantity exceeding 4 mol causes coagulation among particles and this results in the formation of a coarse coagulative titanium trichloride catalytic component, which has a lowered capability as catalytic component for polymerization of an α-olefin. Although there is no particular lower limit, no salient effect can be expected from addition quantity less than 0.01 mol.

In addition to the above stated organic ether compound, a titanium tetrachloride may be also added during the temperature raising process or during the temporary cooling period in the temperature raising process. The addition quantity of this titanium tetrachloride is at least 0.01 mol for one mol of the titanium tetrachloride which is contained in the mixed solvent, preferably more than 0.02 mol and most preferably more than 0.04 mol. Addition quantity less than 0.01 mol of the titanium tetrachloride causes the polymer produced to lack transparency.

The time to add the organic ether compound and/or the titanium tetrachloride during the temperature raising process or during the temporary cooling period in the temperature raising process is as follows: After the whole quantity of the organo-aluminum compound is added at a solvent temperature not exceeding 55° C. in the concomitant presence of 20 to 70% by volume of the aromatic hydrocarbon halide in the mixed solvent, they may be added at an arbitrary point of time during the process of raising the solvent temperature up to a temperature between 45° and 150° C. over a period between 10 minutes and 24 hours, or during the period of temporary cooling effected after the solvent temperature is raised up to 40° to 80° C. or during the reheating process for raising the solvent temperature again up to 45° to 150° C. after this temporary cooling period. In case where the above stated temporary cooling is not carried out, it is preferable to add only the organic ether compound.

Procedures for manufacturing the titanium trichloride catalytic component in accordance with the present invention are as shown by way of example below:

In the presence of the olefin, the titanium tetrachloride and the organic ether compound are dissolved in the mixed solvent either separately or in the form of a mixture or a complex consisting of the titanium tetrachloride and the organic ether compound. Following this, the whole quantity of the organo-aluminum is added to the mixed solvent. However, where the temporary cooling process is to be carried out, the addition of the organo-aluminum compound may be effected by dividing it. The organo-aluminum compound to be added is preferably prepared by allowing it to absorb the olefin beforehand. The temperature of the mixed solvent is preferably adjusted to a temperature below 55° C. at the time of the addition of the organo-aluminum compound, because: If the organo-aluminum compound is added at a temperature exceeding 55° C., the titanium tetrachloride would immediately be reduced to have a fine granular titanium trichloride catalytic component separated and this not only would make adjustment of the particle size difficult but also would lower productivity because of difficulty in carrying out filtration and washing for the catalytic component. After the addition of the organo-aluminum compound, the temperature of the mixed solvent is raised up to a temperature between 45° and 150° C., preferably between 65° and 120° C. and more preferably between 75° and 110° C. The length of time over which the temperature is to be raised up to the specified temperature must be between 10 minutes and 24 hours, preferably between 30 minutes and 12 hours and more preferably between 1 and 8 hours. The temperature raising process is required to be carried out over the above prescribed length of time for obtaining a titanium trichloride catalytic component that has a spherical particle shape and highly uniform particle diameter. If the mixed solvent is suddenly raised from the temperature thereof at the time of the addition of the organo-aluminum compound within a very short length of time, say, less than 10 minutes, the separating titanium trichloride particles would coagulate into an uneven state. Conversely, temperature raising over a long length of time, say, exceeding 24 hours would not give any particularly increased effect.

When the mixed solvent temperature is less than 45° C., the velocity of the reducing reaction is too slow for attaining a satisfactory degree of productivity. Conversely, the upper limit of the temperature of the mixed solvent must be set at a temperature below the boiling point of the compound that has the lowest boiling point among the saturated aliphatic hydrocarbon, the alicyclic hydrocarbon and the aromatic hydrocarbon halide employed. Therefore, the temperature is normally raised not to exceed 150° C.

As for the organic ether compound that is to be added during the temperature raising process, is must be added to the mixed solvent when the temperature of the latter is between 40° C. and 70° C. A catalytic component which is obtained with the organic ether compound added at a mixed solvent temperature not within the above stated range would cause a polymer product to lack transparency and also would make it hardly possible to obtain a polymer having a truly spherical particle shape. Although it is not particularly prescribed, the temperature after the temperature raising process is preferably kept for a period between several minutes and several hours.

The olefin may be allowed to be present until completion of the above stated reaction. However, the purpose of the invention can be fulfilled with the olefin present until the titanium trichloride is completely separated.

Through the above stated procedures, there is obtained a novel, truly spherical titanium trichloride catalytic component having highly uniform particle size with the average particle diameter arbitrarily adjusted to a value between 10 and 500μ. The titanium trichloride catalytic component thus obtained is thoroughly washed by an ordinary method with a hydrocarbon solvent or an aromatic hydrocarbon halide solvent and then can be arranged for storage either in a slurry state or in a state of a dry product obtained through filtration and drying processes.

The titanium trichloride catalytic component manufactured in this manner is used in the preparation of a catalytic component for polymerization of α-olefins in combination with an organo-aluminum compound that can be expressed by a generic formula $AlR_nX_{3-n}$, wherein R represents an alkyl radical, X a halogen atom and n a real number of $0 < n \leq 3$. This organo-aluminum compound may be selected out of the group consisting of triethyl aluminum, diethyl aluminum chloride, ethyl aluminum dichloride, ethyl aluminum sesqui-chloride, triisobutyl aluminum, diisobutyl aluminum chloride, etc.

The quantity ratio of the titanium trichoride catalytic component to the organo-aluminum compound can be set within a wide range by one skilled in the art. However, the ratio is normally set 1:1~20 in mole ratio. Further, an electron donor which is generally used may be used in combination with the catalytic system in carrying out the α-olefin polymerizing process of the invention. The polymerization may be carried out by a suspension polymerization process in which an inert hydrocarbon such as an aromatic hydrocarbon selected out of the group consisting of benzene, toluene, xylene, etc., an aliphatic hydrocarbon selected out of the group consisting of hexane, heptane, octane, etc. or an licyclic hydrocarbon selected out of the group consisting of cyclohexane, cycloheptane, etc. is employed as solvent or by a liquid phase polymerization process in which a liquefied monomer is employed as solvent.

In case where the titanium trichloride catalytic component of the invention is used in a gas phase polymerization process for obtaining an α-olefin, the uniform particle diameter of the titanium trichloride catalytic component facilitates stirring with a gas flow etc. Besides, the particles of the catalytic component are hardly caused to decay by abrasion, etc. because of the excellent strength of the catalytic components; and because at the high polymerization activity and the high stereospecific polymer productivity of the catalytic component, the polymer which is thus produced and taken out of a polymerization tank can be supplied as it is to machining and molding fields. The polymer manufacturing processes thus can be rationalized to a great extent. This is one of the advantageous features of the present invention.

As for the mode of polymerization, the polymerizing operation can be carried out either in a continuous operation mode or in a batch operation mode. The polymerization temperature is set at a temperature between 30° and 120° C. and preferably at a temperature between 50° and 100° C. The polymerization pressure is set at a value between the atmospheric pressure and 100 atm and preferably at a value between the atmospheric pressure and 50 atm.

The α-olefins to be either homo- or co-polymerized with the catalytic system of the invention include ethylene, propylene, butene-1, 4-methyl pentene-1, etc. The molecular weight of the polymer is adjustable by a conventional known method carried out with hydrogen or diethyl zinc.

When the titanium trichloride catalytic component is employed in polymerizing an α-olefin by the polymerization method of the present invention, the polymerization activity of the catalytic component is extremely high and the polymer thus obtained also has a high degree of stereospecificity and a high bulk density.

The particle size of the titanium trichloride catalytic component can be adjusted to obtain a polymer having highly uniform particle diameter within the range from 0.3 to 8 mm. The polymer thus obtained has an almost truly spherical particle shape with transparency and has excellent fluidity. Despite of its large particle diameter, the polymer thus obtained has an excellent deliming property.

The following examples are exemplary of the invention. In the embodiment examples and comparison examples also given hereinafter, there are used symbols the definition of which is as shown below:

a: The number of g of the polymer produced (g-pp, g-pp.g-cat-hr-atm) in unit time, at unit pressure (atm), and per g of the catalytic component (g-cat.) employed P: The number of g of the polymer produced (g-pp/g-cat.) per g of the catalytic component $$HI: \frac{\text{boiling n-heptane insoluble matter (g) in produced solid polymer}}{\text{solid polymer produced}} \times 100(\%)$$

$$II: \frac{\text{solid polymer produced (g)} \times HI}{\text{produced solid polymer (g) + polymer (g) soluble in polymerizing solvent}} (\%)$$

Dc: The average particle diameter (μ) obtained by measuring the diameters of 50 particles with a microscope and then by averaging the measured values.

ρ: The bulk density of the produced solid polymer (g/ml) as measured in accordance with ASTM-D-1895-69 method A or B.

Dp: The average particle diameter of the polymer produced (μ)

G-2 or G-3 glass filter is respectively a glass filter madcat glass manufactured by Kokura Glass Industrial Co. Ltd. which shows 40~5μ or 80~30μ at average diameter in minute openings thereof.

EMBODIMENT EXAMPLE 1

Preparation of the titanium trichloride catalytic component:

The inside of a 500 ml flask equipped with a stirrer was replaced with propylene. Then, 250 ml of a monochloro benzene—n-heptane mixed solvent which had 33% by volume of monochloro benzene mixed therein as an aromatic hydrocarbon halide was introduced into the flask. Further, following the monochloro benzene, 24.2 ml of titanium tetrachloride (0.22 mol, corresponding to 0.88 mol of $TiCl_4$ per liter of the mixed solvent) was added.

While this mixed solvent was kept at a temperature between 20° and 23° C. with stirring, 46.4 ml of di-n-butyl ether (0.28 mol, the mole ratio of the di-n-butyl ether to the titanium tetrachloride corresponding to 1.3) was dropped over a period of 10 minutes. Following this, a solution prepared by dissolving 13.8 ml of diethyl aluminum chloride (0.11 mol, the equivalent ratio of the diethyl aluminum chloride to the titanium tetrachloride being 1.0) in 50 ml of monochloro benzene was dropped over a period of 40 minutes. The mixed solvent was heated at an average temperature raising rate of 0.5° C./min. When the temperature of the mixed solvent reached 55° C., 10.1 ml of di-n-butyl ether (0.06 mol, the mole ratio of the di-n-butyl ether to the titanium tetrachloride corresponding to 0.27) was further dropped over a period of 20 minutes. The temperature of the mixed solvent was 65° C. when the dropping of the di-n-butyl ether was completed. Then, when the temperature of the mixed solvent reached 70° C., the introduction of propylene was stopped and nitrogen was introduced. The temperature was then further raised up to 90° C. and the mixed solvent was kept at that temperature for a period of 30 minutes. After that, the mixed solvent was cooled down to 40° C. and then a separating matter thus obtained was filtrated in a dry nitrogen atmosphere with a G-2 glass filter. A cake thus obtained was washed twice with 100 ml of monochloro benzene and three times with 200 ml of n-hexane. In the washing solvent, there was found no fine granular titanium trichloride catalytic component passed through the G-2 glass filter. The cake thus washed was dried under reduced pressure to obtain 40 g of titanium trichloride catalytic component having highly uniform particle diameter measuring 350μ on the average. The titanium trichloride catalytic component thus obtained was analyzed to find that the catalytic component contained 26.8 wt% of Ti, 61.0 wt% of Cl, 0.2 wt% of Al, 8.8 wt% of di-n-butyl ether and 2.3 wt% of a polymer and that the specific surface area of it as measured by the BET method was 138 m$^2$/g.

The Polymerization Method: The inside of a flask of 1 liter content volume was dried by thoroughly removing the water content thereof. The inside of the flask was then replaced with dry nitrogen and, after that, 400 ml of n-heptane, 100.0 mg of the above stated titanium trichloride catalytic component and 1.6 mmol of diethyl aluminum chloride were placed within the flask. Following that, the nitrogen in the polymerization flask was replaced with propylene. Then, while the pressure of the propylene was kept at 2.0 kg/cm$^2$G, polymerization was carried out for 2.5 hours with stirring and at 70° C.

Upon completion of polymerization, stirring and the introduction of the propylene were stopped. After unreacted propylene was purged, the catalyst was decomposed by supplying 100 ml of an alcohol mixture consisting of isopropanol and methanol in the mixing ratio of 1:3. A solid polymer thus produced was taken out by filtration and washed and dried to obtain 63 g of polypropylene of a truly spherical shape. Meanwhile, 1.0 g of polypropylene which was dissolved in the polymerizing solvent was recovered by solidifying polypropylene in the filtrate by evaporation. The results of the polymerization were as shown in Table 1.

EMBODIMENT EXAMPLE 2

The inside of a 500 ml flask equipped with a stirrer was replaced with propylene. Following this, 300 ml of a monochloro benzene—n-heptane mixed solvent prepared by mixing 45% by volume of the monochloro benzene was introduced into the flask. Then, 24.21 ml of titanium tetrachloride and 55.6 ml of di-n-butyl ether were also added. Following that, the mixed solvent was kept at a temperature between 20° and 23° C. and a solution prepared by dissolving 18.8 ml of diethyl aluminum chloride in 50 ml of monochloro benzene was dropped over a period of 40 minutes. The mixed solvent was heated at an average temperature raising rate of 0.5° C./min. When the temperature of the mixed solvent reached 70° C., the mixed solvent was immediately cooled down to 20° C. and 20.3 ml of di-n-butyl ether and 9 ml of titanium tetrachloride were further dropped respectively over periods of 15 minutes. Following this dropping, the mixed solvent was heated up to 75° C. at an average temperature raising rate of 0.7° C./min. The mixed solvent was then kept at that temperature for one hour. During this temperature raising process, the introduction of the propylene was stopped and nitrogen was introduced when the temperature of the mixed solvent reached 70° C. After that, the temperature was cooled down to 40° C. Then, a separating matter thus obtained was filtrated with a G-3 glass filter in a nitrogen atmosphere. A cake thus obtained was washed five times with 200 ml of n-hexane. In the washing solvent, there was found no fine granular titanium trichloride catalytic component that passed through the G-3 glass filter.

After washing, the cake was dried under reduced pressure to obtain 41 g of a titanium trichloride catalytic component of a highly uniform truly spherical particle shape having particle diameter measuring 20μ on the average.

The titanium trichloride catalytic component thus obtained was used in carrying out polymerization of propylene by the same polymerization method as in Embodiment Example 1 to obtain results which were as shown in Table 1.

COMPARISON EXAMPLE 1

A titanium trichloride catalytic component was prepared in exactly the same manner as in Embodiment Example 1 with the exception of that the propylene was not allowed to be present in this case. As a result, there were obtained 36 g of a titanium trichloride catalytic component which did not pass through the G-2 glass filter and 3.7 g of a titanium trichloride catalytic component which passed through the G-2 glass filter. The ratio of the titanium trichloride catalytic component which decayed into a fine granular state to the whole titanium trichloride catalytic component was 9.3 wt%.

The titanium trichloride catalytic component thus obtained was used in carrying out polymerization of propylene by the same polymerization method as in Embodiment Example 1. The results of the polymerization were as shown in Table 1.

COMPARISON EXAMPLE 2

A titanium trichloride catalytic component was prepared in exactly the same manner as in Embodiment Example 2 with the exception of that the propylene was not allowed to be present in this case. As a result of this, there were obtained 37 g of a titanium trichloride catalytic component which did not pass through the G-3 glass filter and 4.2 g of a fine granular titanium trichloride catalytic component which passed through the G-3 glass filter. The ratio of the titanium trichloride catalytic component which decayed into a fine granular state to the whole titanium trichloride catalytic component was 10.2 wt%.

The titanium trichloride catalytic component which was obtained in this manner was used in carrying out polymerization of propylene by the same polymerization method as in Embodiment Example 1. The results of it were as shown in Table 1.

As apparent from the results of Embodiment Examples 1 and 2 are those of Comparison Examples 1 and 2, the preparation of the titanium trichloride catalytic component in the presence of propylene increases the strength of the particles of the titanium trichloride catalytic component. Therefore, this method of preparation increased the yield of the titanium trichloride catalytic component by 10 percent or thereabout.

EMBODIMENT EXAMPLE 3

The titanium trichloride catalytic component was prepared in exactly the same manner as in Embodiment Example 2 with the exception of that, in this case, 250 ml of a monochloro benzene—n-hexane mixed solvent having 30% by volume of monochloro benzene mixed therein and 60 ml of monochlorobenzene prepared by diluting diethyl aluminium chloride were used. Then, polymerization of propylene was carried out with the titanium trichloride catalytic component used also in the same manner. The results of the polymerization were as shown in Table 1.

EMBODIMENT EXAMPLE 4

The titanium trichloride catalytic component was prepared in exactly the same manner as in Embodiment Example 2 with the exception of that, in this case, 250 ml of a monochloro benzene—n-hexane system mixed solvent prepared with 30% by volume of monochlorobenzene mixed therein was used; 70 ml of monochloro benzene prepared with diethyl aluminum chloride diluted was used; the mixed solvent and a diethyl aluminum chloride solution were colled down to 5° C.; and the diethyl aluminum chloride solution was also allowed to absorb propylene. Then, polymerization of propylene was carried out also in the same manner by using the titanium trichloride catalytic component thus obtained. The results of the propylene polymerization were as shown in Table 1.

EMBODIMENT EXAMPLE 5

The titanium trichloride catalytic component was prepared in exactly the same manner as in Embodiment Example 1 with the exception of that the propylene used in Embodiment Example 1 was replaced with ethylene in this case. With the catalytic component thus obtained used, polymerization of propylene was carried out in the same manner as in Embodiment Example 1. The results of it were as shown in Table 1.

EMBODIMENT EXAMPLE 6

The titanium trichloride catalytic component was prepared and polymerization of propylene was carried out in exactly the same manner as in Embodiment Example 1 with the exception of that, in the preparation of the catalytic component, the propylene used in Embodiment Example 1 was replaced with butene-1. The results of the polymerization were as shown in Table 1.

EMBODIMENT EXAMPLE 7

The titanium trichloride catalytic component was prepared and polymerization of propylene was carried out in exactly the same manner as in Embodiment Example 1 with the exception of that, in the preparation of the titanium trichloride catalytic component, the propylene used in Embodiment Example 1 was replaced with isobutylene. The results of the polymerization were as shown in Table 1.

TABLE 1

| Example No. | Results of polymerization | | | | |
|---|---|---|---|---|---|
| | Dc | a | II | p | Dp |
| Embodiment Example 1 | 350 | 84 | 95.6 | 0.45 | 2,180 |
| Embodiment Example 2 | 20 | 86 | 96.3 | 0.48 | 280 |
| Embodiment Example 3 | 20 | 99 | 97.5 | 0.52 | 290 |
| Embodiment Example 4 | 11 | 105 | 97.7 | 0.52 | 150 |
| Embodiment Example 5 | 340 | 85 | 95.0 | 0.45 | 2,150 |
| Embodiment Example 6 | 400 | 83 | 94.9 | 0.44 | 2,250 |
| Embodiment Example 7 | 420 | 83 | 94.8 | 0.43 | 2,290 |
| Comparison Example 1 | 510 | 83 | 94.7 | 0.43 | 3,800 |
| Comparison Example 2 | 15 | 87 | 95.8 | 0.40 | 180 |

EMBODIMENT EXAMPLES 8–10

The titanium trichloride catalytic component was prepared and polymerization of propylene was carried out in exactly the same manner as in Embodiment Example 1 with the exception of that, in the preparation of the titanium trichloride catalytic component, the composition of the mixed solvent consisting of the monochloro benzene and the n-heptane used in Embodiment Example 1 was changed to various different compositions as shown in Table 2. The results of the polymerization were as shown also in Table 2.

TABLE 2

| Example No. | Preparation of catalytic component | Results of polymerization | | | | |
|---|---|---|---|---|---|---|
| | Concentration of chlorobenzene, % by volume | Dc | a | II | p | Dp |
| Embodiment Example 8 | 30 | 630 | 73 | 92.5 | 0.42 | 2,980 |
| Embodiment Example 9 | 40 | 210 | 83 | 93.5 | 0.40 | 1,890 |
| Embodiment Example 10 | 50 | 15 | 88 | 94.7 | 0.43 | 190 |

EMBODIMENT EXAMPLES 11–13:

In each of these embodiment examples, the titanium trichloride catalytic component was prepared and polymerization of propylene was carried out in exactly the same manner as in Embodiment Example 1 with the exception of that, in the preparation of the titanium trichloride catalytic component, the addition quantity of the diethyl aluminum chloride was changed to various equivalent ratios to the titanium tetrachloride as shown in Table 3. The results of the polymerization were as shown also in Table 3.

TABLE 3

| Example No. | Preparation of catalytic component | Results of polymerization | | | | |
|---|---|---|---|---|---|---|
| | Diethyl aluminum chloride/TiCl$_4$ equivalent ratio | Dc | a | II | p | Dp |
| Embodiment Example 11 | 0.4 | 20 | 55 | 92.8 | 0.40 | 250 |
| Embodiment Example 12 | 1.4 | 40 | 60 | 91.5 | 0.39 | 440 |
| Embodiment Example 13 | 1.7 | 120 | 39 | 92.8 | 0.37 | 970 |

EMBODIMENT EXAMPLES 14–17:

In each of Embodiment Examples 14–17, the titanium trichloride catalytic component was prepared and polymerization of propylene was carried out in exactly the same manner as in Embodiment Example 1 with the exception of that, in the preparation of the catalytic component, the addition quantity of the di-n-butyl ether was adjusted to be in the mole ratio to the titanium tetrachloride as shown in Table 4. The results of the polymerization were as shown also in Table 4.

TABLE 4

| Example No. | Preparation of catalytic component | Results of polymerization | | | | |
|---|---|---|---|---|---|---|
| | di-n-butyl ether/ TiCl$_4$ mole ratio | Dc | a | II | p | Dp |
| Embodiment Example 14 | 1.0 | 200 | 64 | 92.8 | 0.40 | 1,880 |
| Embodiment Example 15 | 1.5 | 40 | 66 | 92.7 | 0.41 | 460 |
| Embodiment Example 16 | 2.0 | 35 | 70 | 92.5 | 0.40 | 410 |
| Embodiment Example 17 | 2.5 | 30 | 67 | 91.0 | 0.35 | 360 |

EMBODIMENT EXAMPLES 18-22:

In each of Embodiment Examples 18-22, the titanium trichloride catalytic component was prepared and polymerization of propylene was carried out in exactly the same manner as in Embodiment Example 1 with the exception of that the use of n-heptane in the preparation of the catalytic component was replaced with the use of various kinds of saturated aliphatic hydrocarbons or alicyclic hydrocarbons as shown in Table 5. The results of the polymerization were as shown also in Table 5.

TABLE 5

| Example No. | Preparation of catalytic component Saturated aliphatic or alicyclic hydrocarbons | Dc | Results of polymerization a | II | $\rho$ | Dp |
|---|---|---|---|---|---|---|
| Embodiment Example 18 | n-hexane | 110 | 80 | 94.2 | 0.41 | 930 |
| Embodiment Example 19 | cyclohexane | 120 | 79 | 92.0 | 0.39 | 950 |
| Embodiment Example 20 | n-octane | 320 | 83 | 94.8 | 0.38 | 2,050 |
| Embodiment Example 21 | methyl cyclohexane | 280 | 81 | 95.5 | 0.38 | 1,950 |
| Embodiment Example 22 | n-decane | 340 | 78 | 95.0 | 0.37 | 2,150 |

EMBODIMENT EXAMPLES 23-30:

In each of these embodiment examples the titanium trichloride catalytic component was prepared and polymerization of propylene was carried out in exactly the same manner as in Embodiment Example 1 with the exception of that, in the preparation of the catalytic component, various kinds of aromatic hydrocarbon halides were used as shown in Table 6 in place of the monochloro benzene which was used in Embodiment Example 1. The results of the polymerization were as shown also in Table 6.

TABLE 6

| Embodiment Example No. | Preparation of catalytic component Aromatic hydrocarbon halides | Dc | Results of polymerization a | II | $\rho$ | Dp |
|---|---|---|---|---|---|---|
| 23 | Ortho-chloro toluene | 350 | 82 | 96.0 | 0.38 | 2,400 |
| 24 | 1,2,4-trichloro benzene | 210 | 84 | 95.8 | 0.40 | 1,340 |
| 25 | Ortho-dichloro toluene | 260 | 84 | 96.0 | 0.40 | 1,770 |
| 26 | Para-chloro toluene | 320 | 82 | 95.5 | 0.40 | 2,300 |
| 27 | Bromo benzene | 300 | 83 | 93.5 | 0.35 | 2,070 |
| 28 | Bromo toluene | 180 | 76 | 91.0 | 0.35 | 1,660 |
| 29 | Iodo benzene | 210 | 80 | 91.5 | 0.36 | 1,620 |
| 30 | Fluoro benzene | 220 | 72 | 92.8 | 0.40 | 1,910 |

EMBODIMENT EXAMPLES 31-33:

In each of these embodiment examples, the titanium trichloride catalytic component was prepared and polymerization of propylene was carried out in exactly the same manner as in Embodiment Example 1 with the exception of that, in the preparation of the catalytic component, various kinds of organic ether compounds were used as shown in Table 7 in place of di-n-butyl ether which was used in Embodiment Example 1. The results of the polymerization were as shown also in Table 7.

TABLE 7

| Embodiment Example No. | Preparation of catalytic component Organic ether compound | Dc | Results of polymerization a | II | $\rho$ | Dp |
|---|---|---|---|---|---|---|
| 31 | Diethyl ether | 75 | 48 | 90.5 | 0.35 | 620 |
| 32 | di-n-propyl ether | 100 | 72 | 93.5 | 0.40 | 900 |
| 33 | di-n-amyl ether | 110 | 71 | 93.6 | 0.40 | 940 |

EMBODIMENT EXAMPLES 34-38:

In each of these embodiment examples, the titanium trichloride catalytic component was prepared and polymerization of propylene was carried out in exactly the same manner as in Embodiment Example 1 with the exception of that, in the preparation of the catalytic component, various kinds of organo-aluminum compounds were used as shown in Table 8 in place of the diethyl aluminum chloride which was used in Embodiment Example 1. The results of the polymerization were as shown also in Table 8.

TABLE 8

| Embodiment Example No. | Preparation of catalytic compound Organo-aluminum compounds | Dc | Results of polymerization a | II | $\rho$ | Dp |
|---|---|---|---|---|---|---|
| 34 | DEAL-H See Note 1 | 350 | 83 | 96.5 | 0.39 | 2,150 |
| 35 | DIBAL-H See Note 2 | 350 | 81 | 96.8 | 0.38 | 2,160 |
| 36 | EASC See Note 3 | 20 | 80 | 96.0 | 0.38 | 280 |
| 37 | EADC See Note 4 | 20 | 74 | 96.1 | 0.39 | 270 |
| 38 | DIBAC See Note 5 | 310 | 80 | 95.6 | 0.36 | 2,050 |

NOTES
1. DEAL-H: Diethyl aluminum hydride
2. DIBAL-H: Diisobutyl aluminum hydride
3. EASC: Ethyl aluminum sesqui-chloride
4. EADC: Ethyl aluminum dichloride
5. DIBAC: Diisobutyl aluminum chloride

EMBODIMENT EXAMPLES 39-46:

In each of these embodiment examples, the titanium trichloride catalytic component was prepared and polymerization of propylene was carried out in exactly the same manner as in Embodiment Example 2 with the exception of that, in the preparation of the catalytic component, the quantity of the monochloro benzene and n-hexane mixed solvent in which 30% by volume of monochloro benzene was mixed and that of the monochloro benzene which diluted the diethyl aluminum chloride were respectively changed to 250 ml and 60 ml and that the quantities of the di-n-butyl ether and the titanium tetrachloride to be added during the temporary cooling period were changed as shown in Table 9. The results of the polymerization were as shown also in Table 9.

TABLE 9

| Embodiment Example No. | Preparation of catalytic component di-n-butyl ether addition qty, ml | TiCl4 add. qty, ml | Dc | Results of polymerization a | II | $\rho$ | Dp |
|---|---|---|---|---|---|---|---|
| 39 | 0.4 | 9 | 25 | 90 | 93.5 | 0.49 | 360 |
| 40 | 18.8 | 9 | 21 | 95 | 97.0 | 0.52 | 300 |
| 41 | 88.6 | 9 | 19 | 97 | 95.8 | 0.40 | 280 |
| 42 | 20.3 | 4.4 | 20 | 95 | 95.7 | 0.48 | 290 |
| 43 | 20.3 | 17.6 | 21 | 97 | 98.2 | 0.53 | 290 |
| 44 | 20.3 | 33.0 | 20 | 93 | 98.7 | 0.53 | 280 |
| 45 | 13.5 | 8.8 | 23 | 98 | 96.7 | 0.51 | 330 |

TABLE 9-continued

| Embodiment Example No. | Preparation of catalytic component | | Results of polymerization | | | | |
|---|---|---|---|---|---|---|---|
| | di-n-butyl ether addition qty, ml | TiCl4 add. qty, ml | Dc | a | II | p | Dp |
| 46 | 33.7 | 22.0 | 20 | 99 | 98.0 | 0.52 | 290 |

EMBODIMENT EXAMPLE 47

The inside of an autoclave of 2 liter content volume which is made of stainless steel and equipped with a stirrer was replaced with dry nitrogen. Then, 45.0 mg of a titanium trichloride catalytic component which was prepared in exactly the same manner as in Embodiment Example 3 and 4 mmol of diethyl aluminum chloride were placed in the autoclave. Following this, 100 mmol of hydrogen and 500 g of liquefied propylene were supplied to the inside of the autoclave with pressure to carry out polymerization at 80° C. for one hour. After one hour, heating and stirring were stopped and unreacted propylene was purged to obtain 162 g of a polymer. The results of the polymerization were as follows: a: 96.6, P: 3,600, HI: 96.0, $\rho$: 0.50, and Dp: 950.

EMBODIMENT EXAMPLE 48

An atactic polypropylene was extracted using boiling n-heptane. Following this, drying, classification and deoxidation were carried out to obtain 50 g of a stereospecific polypropylene. The 50 g of stereospecific polypropylene thus obtained was placed within stainless steel autoclave which was of 2 liter content volume and had the inside thereof replaced with dry nitrogen beforehand. Following this, 41.0 mg of a titanium trichloride catalytic component which was prepared in exactly the same manner as in Embodiment Example 3 and 10 ml of n-heptane containing 4 mmol of diethyl aluminum chloride were placed within the autoclave. The internal temperature of the autoclave was adjusted to 70° C. and then supply of propylene was started to carry out gas phase polymerization of propylene. After the polymerization was carried on for two hours under pressure of 25 kg/cm$^2$G, stirring, heating and the supply of propylene were stopped. Unreacted propylene was purged to obtain 205 g of polypropylene. The results of the polymerization were: a: 72.7, P: 5,000, HI: 92.0, $\rho$: 0.42 and Dp: 780.

EMBODIMENT EXAMPLE 49

Using a stainless steel autoclave which is of 2 liter content volume and is equipped with a stirrer, 1 liter of n-heptane, and 5 mmol of diethyl aluminum chloride and 47.0 mg of a titanium trichloride catalytic component which was prepared in exactly the same manner as in Embodiment Example 3 were placed in the autoclave.

After the autoclave was heated to make the internal temperature thereof 70° C., an ethylene-propylene mixture gas containing 5.2% by volume of ethylene was introduced into the autoclave under pressure of 10 kg/cm$^2$G to carry out polymerization for two hours. Heating, stirring and the introduction of the mixture gas were stopped after two hours and unreacted mixture gas was purged. Then, the content of the autoclave was filtrated, washed and dried to obtain 155 g of a polymer. The polymer thus obtained was analyzed by infrared absorption spectrum to find that the polymer contained 3.5% of polyethylene.

The results of the polymerization were: a: 150, P: 3,300, II: 73.0 and $\rho$: 0.32.

EMBODIMENT EXAMPLE 50

The inside of a stainless steel autoclave which was of 5 liter content volume and was equipped with a stirrer was replaced with dry nitrogen. Then, 55.0 mg of a titanium trichloride catalytic component which was prepared in exactly the same manner as in Embodiment Example 3 and 4 mmol of diethyl aluminum chloride were placed in the autoclave. Following that, the pressure within the autoclave was reduced to 10 mmHg. Hydrogen was supplied up to 0.1 kg/cm$^2$G. Then, 940 g of propylene was supplied with pressure. Polymerization was thus carried out at an internal temperature of 70° C. for two hours. After two hours, the internal temperature was lowered down to 60° C. and 46 g of ethylene was supplied with pressure. The polymerization was further carried on for two hours and then heating and stirring were stopped and the unreacted monomer was purged to obtain 648 g of a polymer. This polymer was analyzed by infrared absorption spectrum to find that the polymer contained 3.5% by weight of polyethylene. The results of the polymerization were: P: 11,780, HI: 88.7 and $\rho$: 0.45.

EMBODIMENT EXAMPLES 51 AND 52

In each of these embodiment examples, the titanium trichloride catalytic component was prepared and propylene was polymerized in exactly the same manner as in Embodiment Example 2 with the exception of that, in the preparation of the catalytic component, the addition of the di-n-butyl ethyl ether and the titanium tetrachloride during the temporary cooling period was replaced, in this case, with the addition of a complex consisting of di-n-butyl ether and titanium tetrachloride in the mole ratio of 1:1. The results of the polymerization carried out with this catalytic component used were as shown in Table 11.

TABLE 11

| Embodiment Example No. | Preparation of catalytic component | Results of polymerization | | | | |
|---|---|---|---|---|---|---|
| | Addition qty of complex (mol) | Dc | a | II | p | Dp |
| 51 | 0.08 | 23 | 94 | 96.5 | 0.45 | 310 |
| 52 | 0.20 | 21 | 92 | 96.3 | 0.45 | 290 |

EMBODIMENT EXAMPLES 53–55

In each of these embodiment examples, the titanium trichloride catalytic component was prepared and propylene was polymerized in exactly the same manner as in Embodiment Example 2 with the exception of that, in the preparation of the catalytic component, the process of dropping di-n-butyl ether and the titanium tetrachloride over the periods of 15 minutes respectively during the temporary cooling period in Embodiment Example 2 was replaced with a process in which di-n-butyl ether and titanium tetrachloride were dropped simultaneously over a period of 15 minutes in quantities as shown in Table 12. The results of the polymerization which was carried out with this catalytic component used were as shown also in Table 12.

TABLE 12

| Embodiment Example No. | Preparation of catalytic component | | Results of polymerization | | | | |
|---|---|---|---|---|---|---|---|
| | di-n-butyl ether add. qty, ml | TiCl₄ add. qty, ml | Dc | a | II | p | Dp |
| 53 | 20.3 | 9 | 19 | 97 | 97.6 | 0.52 | 300 |
| 54 | 20.3 | 17.6 | 20 | 97 | 98.0 | 0.53 | 300 |
| 55 | 33.7 | 22.0 | 20 | 98 | 98.0 | 0.52 | 310 |

EMBODIMENT EXAMPLE 56

Using a sample plate arrangement consisting of two upper and lower disc shaped glass plates measuring 13 mm in diameter, the upper one measuring 3 mm and the lower one measuring 5 mm in thickness respectively, about 0.01 g of titanium tetrachloride catalytic component was interposed in between the sample plates. Then, a cylindrical body made of alumina measuring 13 mm in diameter and 20 mm in thickness was placed on top of the pair of plates in such a way as to disperse an impact and, to stabilize the arrangement, they were set in a cylinder which had its upper part open.

A steel ball measuring 11.9 mm in diameter and weighting 6.87 g was allowed to fall on the arrangement. Then, the catalytic component placed in between the sample plates was examined by means of a microscope to find whether or not the particles of titanium trichloride catalytic component were crashed. When no particle was crashed, the steel ball was allowed to fall from a point higher than the previous point by 0.5 cm next time. This was repeated until there were observed crashed particles. To indicate the result of this test, the highest point of height that did not have the particles crashed was expressed in cm as a parameter expressing the strength of the particles of the catalytic component.

The whole process of the above stated test was carried out in a dry nitrogen atmosphere. The test was applied not only to each titanium trichloride catalytic component obtained in accordance with the invention but also to other titanium trichloride catalytic components which are prepared for the sake of comparison. One of such comparison samples was prepared in accordance with a method (hereinafter will be called the method of a Japanese patent application laid-open No. 47-34478) wherein a β-type titanium trichloride was obtained by lowering the temperature of titanium tetrachloride and by reducing it with an organo-aluminum and then the titanium trichloride thus obtained was subjected to a heating treatment which was carried out in titanium tetrachloride. Another comparison sample was prepared in accordance with a method (hereinafter will be called the method of a Japanese patent application laid-open No. 54-90094) wherein, in separating a titanium trichloride catalytic component from a solution of a saturated aliphatic hydrocarbon and/or an alicyclic hydrocarbon in which titanium tetrachloride, an organic ether compound and an organo-aluminum compound were dissolved, the above stated organo-aluminum compound was added at a solvent temperature not exceeding 55° C. in the concomitant presence of 20–70% by volume of an aromatic hydrocarbon halide included in the mixed solvent; and, after the addition, the solvent temperature was raised up to a temperature between 45° and 150° C. over a period between 10 minutes and 24 hours. Each of these samples of catalytic components measured 20μ in average particle diameter.

The results of the test which are shown below indicate that the titanium trichloride catalytic component of the present invention excels also in strength:

| | |
|---|---|
| The titanium trichloride catalytic component of the invention: | 14.0 |
| A catalytic component obtained in accordance with the method of a Japanese patent application laid-open No. 47-34478: | 9.5 |
| A catalytic component obtained in accordance with the method of a Japanese patent application laid-open No. 54-90094; | 8.5 |

COMPARISON EXAMPLES 3–5

In each of these comparison examples, a titanium trichloride catalytic component was prepared in exactly the same manner as in each of Embodiment Examples 8–10 with the exception of that the mixed solvent used in these embodiment examples was replaced with the use of a monochloro benzene—toluene mixed solvent. However, as shown in Table 10, it was impossible to control the average particle diameter of the catalytic component thus obtained.

TABLE 10

| | Monochloro benzene, % by volume | dc |
|---|---|---|
| 3 | 30 | 12 |
| 4 | 40 | 15 |
| 5 | 50 | 11 |

REFERENCE EXAMPLE 1

A solid titanium trichloride composite was manufactured in accordance with Embodiment Example 1 given in the specification of a Japanese patent application laid-open No. 52-142691 in the presence of propylene as described below:

After the inside of a 500 ml flask was replaced with propylene, 150 ml of hexane and 38 ml of TiCl₄ were placed in the flask. Then, with the contents of the flask kept at 0° C., 44 ml of diethyl aluminum chloride which was diluted with 100 ml of hexane was dropped over a period of 60 minutes. Then, the introduction of propylene was stopped and replaced with introduction of nitrogen with the temperature kept unchanged for 30 minutes. Following that, the temperature was raised up to 50° C. over a period of 60 minutes and then stirring was further carried on for two hours. After the reaction system was left intact at room temperature, the liquid phase portion thereof was separated. The product thus obtained was washed 5 times with 100 ml of hexane and then was dried under reduced pressure to obtain 75 g of titanium trichloride composite. The average particle diameter was 52μ and the particle diameter was uneven because of coagulative crystals.

REFERENCE EXAMPLE 2

A titanium trichloride composite was manufactured in exactly the same manner as in Reference Example 1 with the exception of that the propylene was replaced with nitrogen in this case. As a result, there was obtained a titanium trichloride composite, which measured 35μ in average particle diameter. The particle diameter of the composite was uniform. There was observed no coagulative crystals.

What is claimed is:

1. A titanium trichloride catalytic component for α-olefin polymerization and which is prepared by separation, in the presence of an olefin of not more than 6 carbon atoms, of a titanium trichloride catalytic component from a solution prepared by dissolving (1) titanium tetrachloride, (2) an organic ether compound represented by the formula ROR', wherein R and R' are alkyl groups which are the same or different with at least one of them having not more than 5 carbon atoms, and (3) an organo-aluminum compound represented by the formula $AlR_nX_{3-n}$ wherein R is an alkyl group of 1 to 10 carbon atoms, X is halogen or hydrogen and $0 < n \leq 3$ in a mixed solvent which is prepared by allowing 20 to 70% by volume of an aromatic hydrocarbon halide to be concomitant with a saturated aliphatic hydrocarbon and/or alicyclic hydrocarbon; said organo-aluminum compound, said titanium tetrachloride and said organic ether compound being added to said mixed solvent at a solvent temperature not exceeding 55° C.; thereafter, increasing the solvent temperature to a value between 45° and 150° C. over a period between 10 minutes and 24 hours and, during the process of increasing the temperature, adding an additional amount of said organic ether compound and/or said titanium tetrachloride to said solution, to enable said titanium trichloride catalytic compound to be separated from the solution in the form of uniform particles having an average diameter of between 10 and 500μ.

2. A titanium trichloride catalytic component for α-olefin polymerization according to claim 1 wherein said aromatic hydrocarbon halide is a chlorinated aromatic hydrocarbon and/or a brominated aromatic hydrocarbon.

3. A titanium trichloride catalytic component according to claim 1 wherein the components to be dissolved in said mixed solvent include less than 5 mol of the titanium tetrachloride for one liter of said mixed solvent; 0.8 to 3 mol of the organic ether compound for one mol of said titanium tetrachloride; and 0.3 to 1.8 equivalent of said organo-aluminum compound relative to said titanium tetrachloride.

4. A titanium trichloride catalytic component according to claim 1 wherein said organic ether compound to be added during said temperature increasing process is used in quantity not exceeding 4 mol for 1 mol of said titanium tetrachloride contained in said mixed solvent.

5. A titanium trichloride catalytic component according to claim 1 wherein said titanium tetrachloride to be added during said temperature increasing process is used in quantity at least 0.01 mol for 1 mol of the titanium tetrachloride contained in said mixed solvent.

6. A titanium trichloride catalytic component according to claim 1 wherein said organic ether compound and/or said titanium tetrachloride to be added during said temperature increasing process is added at a temperature within a temperature range from 40° to 70° C.

7. A titanium trichloride catalytic component according to claim 1 wherein, in case where temporary cooling is to be carried out during said temperature increasing process, said organic ether compound and/or said titanium tetrachloride which is to be added during said temperature increasing process is added during the period of said temporary cooling.

* * * * *

UNITED STATES PATENT AND TRADEMARK OFFICE
CERTIFICATE OF CORRECTION

PATENT NO. : 4,329,251
DATED : May 11, 1982
INVENTOR(S) : SUNADA ET AL

It is certified that error appears in the above-identified patent and that said Letters Patent is hereby corrected as shown below:

Column 21, line 17: after "alicyclic hydrocarbon" insert --in the presence of an olefin--.

Signed and Sealed this

Nineteenth Day of March 1985

[SEAL]

Attest:

DONALD J. QUIGG

Attesting Officer    Acting Commissioner of Patents and Trademarks